United States Patent [19]

Trcka et al.

[11] Patent Number: 5,289,323
[45] Date of Patent: Feb. 22, 1994

[54] AUTOTRACKING FOR A HELICAL SCAN MAGNETIC TAPE RECORDER

[75] Inventors: Milan V. Trcka, Claremont; James S. Bacon, Irvine; Jose G. Aguilar, Pico Rivera, all of Calif.

[73] Assignee: Datatape Incorporated, Pasadena, Calif.

[21] Appl. No.: 834,965

[22] Filed: Feb. 14, 1992

[51] Int. Cl.$^5$ .............................................. H04N 5/795
[52] U.S. Cl. .................................. 360/77.13; 360/73.12
[58] Field of Search ............... 360/73.04, 73.12, 73.13, 360/78.02, 77.13

[56] References Cited

U.S. PATENT DOCUMENTS

| | | | |
|---|---|---|---|
| 4,120,008 | 10/1978 | Metzger et al. | 360/70 |
| 4,163,262 | 7/1979 | Kaemmerer | 360/73.12 X |
| 4,348,699 | 9/1982 | Tsuchiya et al. | 360/73.12 X |
| 4,581,662 | 4/1986 | Sato | 360/75 |
| 4,647,992 | 3/1987 | Vinal | 360/77 |
| 4,905,093 | 2/1990 | Satoh | 358/335 |
| 5,182,681 | 1/1993 | Yamazaki | 360/73.12 X |

*Primary Examiner*—Michael Koczo
*Attorney, Agent, or Firm*—William F. Noval

[57] ABSTRACT

In a helical scan magnetic tape recorder, a rotary magnetic head scanner includes odd and even azimuth data reproduce heads and odd and even azimuth sense heads on the head wheel to effect automatic tracking. The odd and even azimuth sense heads establish a tracking error signal when reproduced signal envelopes are not equal. The error signal is used to control a capstan servo to maintain correct data head-to-track positioning.

3 Claims, 3 Drawing Sheets

AUTOTRACKING FOR A HELICAL SCAN MAGNETIC TAPE RECORDER

FIELD OF INVENTION

This invention relates in general to magnetic tape recording and reproducing apparatus and, more particularly, to a technique for automatic tape tracking in a helical scan magnetic tape recorder which eliminates the need for a control track or pilot signals for tracking, thus increasing the amount of data that can be recorded on magnetic tape.

Description of the Prior Art

Magnetic tape recorders are widely used for the recording and reproducing of large amounts of information, such as video or audio information and digital data. In a typical helical scan cassette recorder, magnetic tape contained in a two-reel cassette is threaded from the cassette along a tape transport path which includes a helical path about a rotary head scanner. The rotary head scanner typically includes two or more magnetic heads on opposite sides of a head wheel. The magnetic heads have head gaps which are tilted at opposite azimuth angles. As the magnetic tape traverses a helical path relative to a rotating magnetic head, the head crosses the width of the tape at a shallow angle to record adjacent slanted tracks on the tape. When the information recorded in the slant tracks is reproduced, it is necessary that the magnetic heads exactly scan the recorded tracks in order to minimize signal degradation and maintain high signal-to-noise ratio.

Several tracking techniques have been proposed to effect accurate tracking of magnetic heads during playback. One technique uses a separate longitudinal control track along the bottom of the tape upon which is recorded a timing reference signal. The reference signal is reproduced by a stationary magnetic head and is locked to a scanner position signal. A capstan servo system is controlled to correctly position the reproduce head with respect to the recorded data track on tape. The control track type of automatic tracking system is disadvantageous due to the reduced width of tape available for recording information, and due to the complexity of recorder design requiring extra magnetic heads and associated circuitry.

An alternative automatic tracking scheme used in 8 mm video cassette recorders utilizes low frequency pilot tones which are added to the data prior to recording. Although this method eliminates the control track and associated heads and circuitry from the magnetic tape recorder, any saving gained by eliminating the control track circuitry would be offset by additional automatic track finding circuitry which processes the low frequency pilot tones. Another automatic tracking scheme, used in digital audio tape recorders (RDAT), is known as area divided automatic track finding (ATF). In this tracking scheme, the tape is subdivided into several unique sections using four data tracks to form an ATF pattern. Although this technique eliminates the control track and control track head from the record scanner, any saving gained by eliminating control track circuitry is offset by additional ATF circuitry. Since this method uses portions of the recorded track specifically for ATF signals, increased tape utilization for recording data is negated.

The following patents disclose various tracking techniques which do not completely satisfy the need for a cost effective, efficient, and simple automatic tape tracking system. U.S. Pat. No. 4,120,008, issued Oct. 10, 1978, inventors Metzger et al.; U.S. Pat. No. 4,905,093, issued Feb. 27, 1990, inventor Satoh; U.S. Pat. No. 4,581,662, issued Apr. 8, 1986, inventor Sato; and U.S. Pat. No. 4,647,992, issued Mar. 3, 1987, inventor Einal. The '992 patent is disadvantageous because it uses complex and expensive differentially sensitive magnetic heads. The '008 patent is disadvantageous because the disclosed technique requires a special recorded format using a pilot signal recorded periodically. This requires special recording and playback circuitry which is complex and expensive and the recorded signal may corrupt the reproduced data signal.

SUMMARY OF THE INVENTION

According to the present invention, there is provided an automatic tracking technique for use in helical scan magnetic tape recorders which is an improvement over known automatic tracking techniques. The technique eliminates the control track from the tape format to increase the amount of data recorded on the tape. Control track circuitry is eliminated from the recording, resulting in a saving of power, weight and space. Elimination of pilot signals in the recorded format eliminates the possibility of corruption of data by the tracking system.

According to an aspect of the present invention, a helical scan magnetic tape recorder includes a rotary head scanner having at least two record/reproduce heads having different azimuths and having additional azimuth sense heads spaced from the record/reproduce heads. The azimuth sense heads read the odd and even azimuth tracks, producing radio frequency envelopes which are integrated and subtracted from each other. Any difference in the sensed signals is used as a magnitude and direction position error signal. The error signal is applied to the capstan servo to advance or retard the magnetic tape such that any position error is minimized and the reproduce heads are located properly relative to the recorded tracks on tape.

DESCRIPTION OF THE PREFERRED EMBODIMENTS

Figure 1:
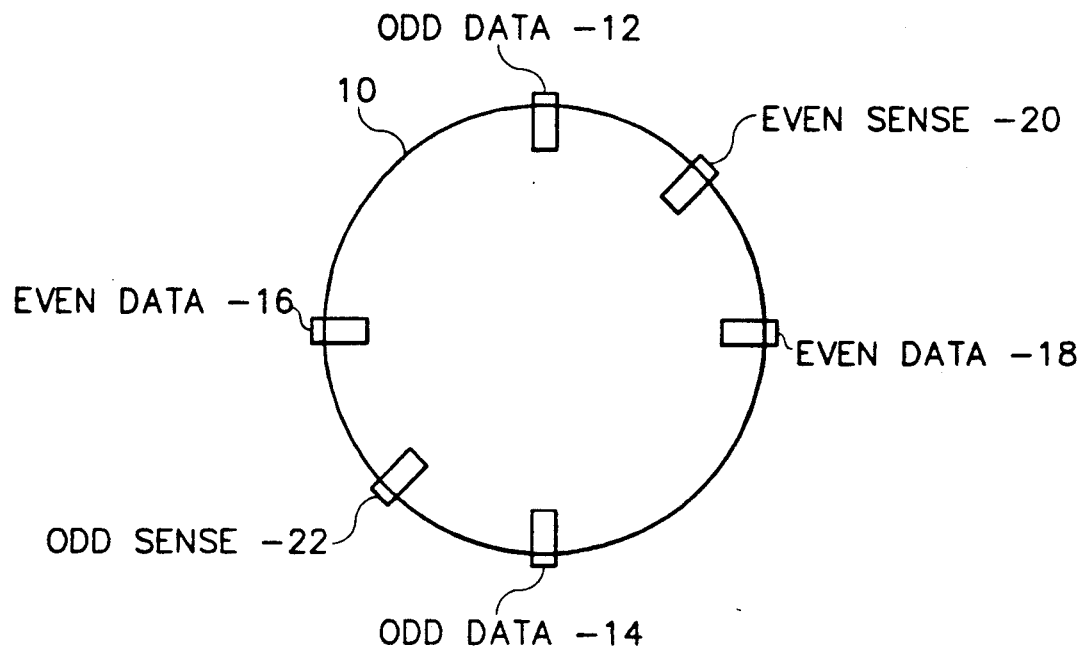
FIG. 1 is a diagrammatic view of a scanner headwheel incorporating an embodiment of the present invention.

Referring now to FIG. 1, there is shown a diagrammatic view of a rotatable reproduce scanner headwheel 10 of a helical scan magnetic tape recorder. Headwheel 10 has odd azimuth, data record/reproduce heads 12 and 14 (spaced 180° from each other and 90° from adjacent data heads), even azimuth data record/reproduce heads 16 and 18 (spaced 180° from each other and 90° from adjacent data heads), even sense head 20 (spaced 45° from adjacent data heads), and odd sense head 22 (spaced 45° from adjacent data heads). The odd data and sense heads 12, 14, 20 have a head gap which is tilted in one direction relative to a transverse line across the head and the even data and sense heads 16, 18, 22 have a head gap which is tilted in an opposite direction relative to a transverse line across the head.

Figure 2:
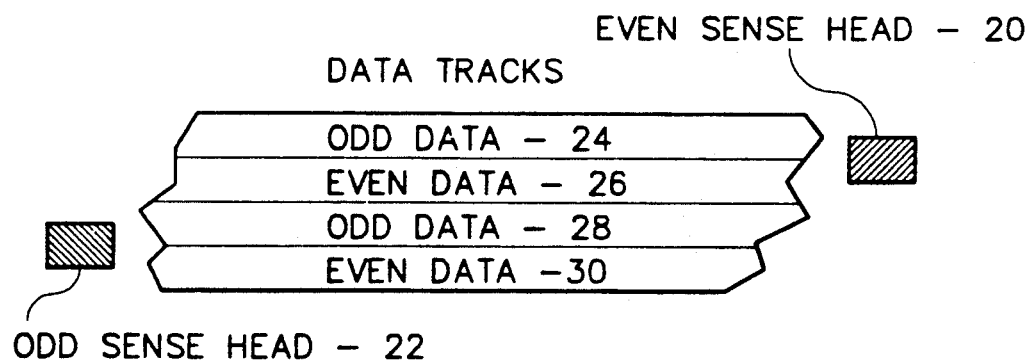
FIG. 2 is a diagrammatic view of the relative location of the sense heads with respect to the data tracks on magnetic tape.

As shown in FIG. 2, a plurality of adjacent data tracks on magnetic tape include alternating odd data track 24, even data track 26, odd data track 28, and even data track 30. In a helical scan magnetic tape recorder, tracks 24-30 are recorded at a slant angle across the width of magnetic tape as the tape is moved in a helical path past the rotating scanner headwheel. Upon reproduction, odd data track 24 is read by odd data head 12, even data track 26 is read by even data head 18, odd data track 28 is read by odd data head 14, and even data track 30 is read by even data head 16. Although even sense head 20 reads data from both odd data track 24 and even data track 26, since data reproduction by a head of a different azimuth angle from the recorded data is greatly attenuated, the even sense head 20 reads data from even data track 26, and odd sense head 22 reads data from odd data track 28.

Figure 3:
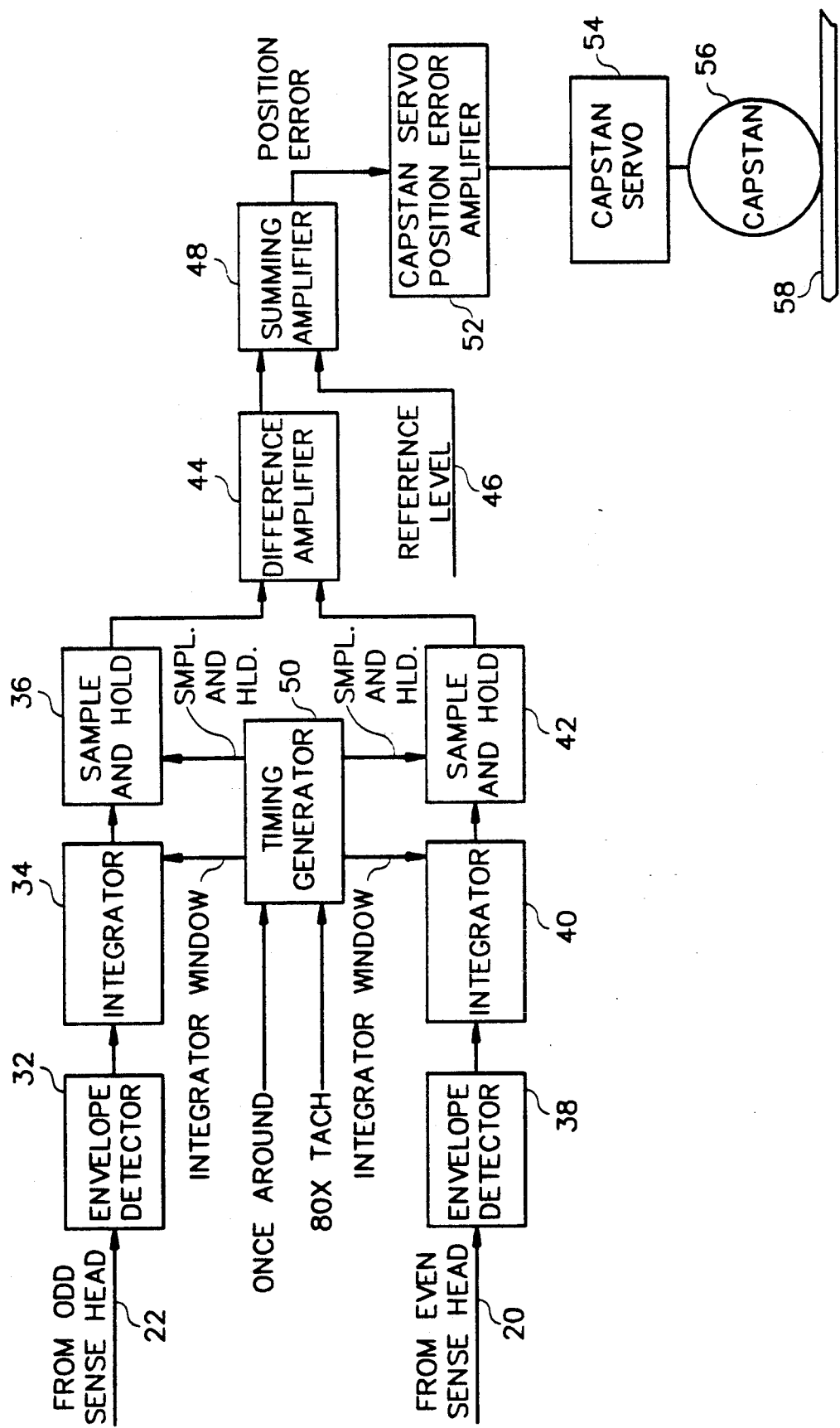
FIG. 3 is a block diagram of one embodiment of autotracking sensing circuit.

Referring now to FIG. 3, there is shown an autotracking sense circuit for processing the signals read by even and odd sense heads 20 and 22. As shown, the signal produced by odd sense head 22 is applied to envelope detector 32, which produces a signal which is integrated by integrator 34. The integrated signal from integrator 34 is applied to sample and hold circuit 36. Similarly, the even sense signal from head 20 is applied to envelope detector 38, which produces a signal which is integrated by integrator 40. The output of integrator 40 is applied to sample and hold circuit 42. The outputs from sample and hold circuits 36 and 42 are applied to difference amplifier 44. Any difference signal produced by difference amplifier 44 is level shifted by summing amplifier 48 which has a reference level input 46. A once around headwheel position signal and tachometer signal are applied to a timing generator 50. Timing signal generator 50 applies (1) integrating window signals to integrator circuits 34 and 40, and (2) sample and hold signals to sample and hold circuits 36 and 42.

The radio frequency envelopes from heads 22 and 20 are integrated during a time window derived from the headwheel position signal. At the end of the integration period, this signal is sampled by sample and hold circuits 36 and 42. The sampled signals are fed to difference amplifier 44. Summing amplifier 48 shifts the level of the position error signal and applies it to capstan servo position error amplifier 52. This amplified error signal is applied to capstan servo circuit 54 which retards or accelerates capstan 56 to retard or accelerate magnetic tape 58 so that the reproduce heads 12-18 are positioned directly over the recorded data tracks in order to maximize the reproduce signal and signal-to-noise ratio.

Figure 4:
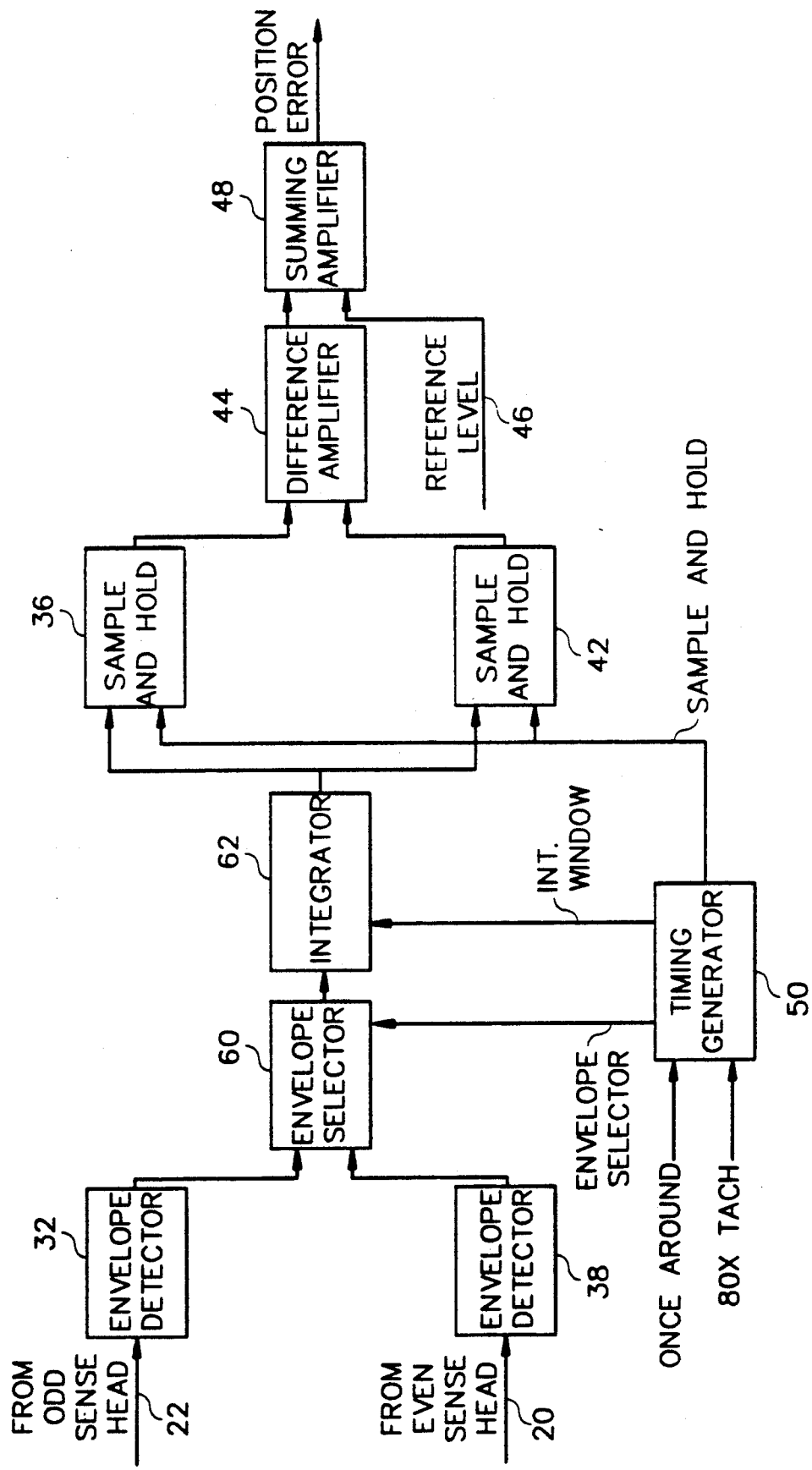
FIG. 4 is another embodiment of an autotracking sensing circuit.

Referring now to FIG. 4, there is shown another embodiment of automatic tracking sensing circuit. As shown, the output of envelope detectors 32 and 38 are applied to an envelope selector circuit 60, which is fed a envelope selection signal from timing generator 50. A single integrator 62 integrates either the envelope signal supplied by envelope detector 32 or the envelope signal supplied by envelope detector 38. The output of integrator 62 is fed to either of sample and hold circuits 36 and 42, the outputs of which are applied to difference amplifier 44. Any error signal is level shifted by summing amplifier 48, as in the circuit of FIG. 3.

The invention has been described in detail with particular reference to preferred embodiments thereof, but it will be understood that variations and modifications can be effected within the spirit and scope of the invention.

INDUSTRIAL APPLICATION

The disclosed automatic tracking technique finds application in helical scan magnetic tape recorders which record and reproduce audio, video and digital data information on magnetic tape.

What is claimed is:

1. In a helical scan magnetic tape reproducing apparatus including a headwheel having spaced odd and even azimuth reproduce heads and a capstan servo for controlling the movement of magnetic tape past said reproduce heads, the improvement comprising:

odd and even azimuth sense heads located on said headwheel spaced from said odd and even reproduce heads; and autotracking circuit means for detecting the signals produced by said odd and even sense heads and for producing an error signal, which is applied to said capstan servo to retard or accelerate magnetic tape so that said reproduce heads are properly positioned relative to recorded tracks on said tape;

wherein said autotracking circuit means includes (1) envelope detector means for detecting the radio frequency envelopes produced by said odd and even sense heads;

(2) integrator means for integrating said sensed envelope signals;

(3) sample and hold means for sampling and holding the odd and even sense signals integrated by said integrator means; and (4) difference amplifier means for producing an error signal from said signals from said sample and hold circuit means wherein said error signal is applied to said capstan servo; and wherein said envelope detector means includes odd and even envelope detector means for respectively detecting the radio frequency envelopes produced by said odd and even sense heads; wherein said integrator means includes odd and even integrator means for respectively integrating said odd and even envelopes detected by said odd and even envelope detector means; and wherein said sample and hold means includes odd and even sample and hold means for respectively sampling and holding said integrated signals from said odd and even integrating means.

2. In a helical scan magnetic tape reproducing apparatus including a headwheel having spaced odd and even azimuth reproduce heads and a capstan servo for controlling the movement of magnetic tape past said reproduce heads, the improvement comprising:

odd and even azimuth sense heads located on said headwheel spaced from said odd and even reproduce heads; and autotracking circuit means for detecting the signals produced by said odd and even sense heads and for producing an error signal, which is applied to said capstan servo to retard or accelerator magnetic tape so that said reproduce heads are properly positioned relative to recorded tracks on said tape;

wherein said autotracking circuit means includes (1) envelope detector means for detecting the radio frequency envelopes produced by said odd and even sense heads;
(2) integrator means for integrating said sensed envelope signals;
(3) sample and hold means for sampling and holding the odd and even sense signals integrated by said integrator means; and
(4) difference amplifier means for producing an error signal from said signals from said sample and hold circuit means wherein said error signal is applied to said capstan servo; and wherein said envelope detector means includes odd and even envelope detector means for respectively detecting the radio frequency envelopes produced by sad odd and even sense heads; and including envelope selector means for alternately selecting one or the other of said odd or even envelope detector means to pass the selected envelope to said integrator means.

3. The improvement of claim 2, including timing generator means for receiving rotational position timing signals from said headwheel and for applying integration window and sample and hold timing signals, respectively, to said integrator means and said sample and hold means.

* * * * *